United States Patent
Kwon et al.

(10) Patent No.: US 9,014,890 B2
(45) Date of Patent: Apr. 21, 2015

(54) CONTROL SYSTEM AND METHOD OF HYBRID VEHICLE

(75) Inventors: Gi Young Kwon, Seoul (KR); Sang Joon Kim, Seoul (KR); Seong Ik Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 287 days.

(21) Appl. No.: 13/619,426

(22) Filed: Sep. 14, 2012

(65) Prior Publication Data

US 2013/0151048 A1   Jun. 13, 2013

(30) Foreign Application Priority Data

Dec. 12, 2011   (KR) .................. 10-2011-0132870

(51) Int. Cl.

| | |
|---|---|
| B60L 9/00 | (2006.01) |
| B60L 11/00 | (2006.01) |
| G05D 1/00 | (2006.01) |
| G05D 3/00 | (2006.01) |
| G06F 7/00 | (2006.01) |
| G06F 17/00 | (2006.01) |
| B60W 20/00 | (2006.01) |
| B60W 10/02 | (2006.01) |
| B60W 10/06 | (2006.01) |
| B60W 10/08 | (2006.01) |
| B60W 30/194 | (2012.01) |
| B60K 6/387 | (2007.10) |
| B60K 6/365 | (2007.10) |
| B60K 6/445 | (2007.10) |
| B60K 6/38 | (2007.10) |

(52) U.S. Cl.
CPC ............... *B60W 20/00* (2013.01); *B60K 6/445* (2013.01); *B60W 10/02* (2013.01); *B60W 10/06* (2013.01); *B60W 10/08* (2013.01); *B60W 30/194* (2013.01); *B60W 2710/0644* (2013.01); *B60W 20/40* (2013.01); *Y02T 10/6286* (2013.01); *B60K 6/365* (2013.01); *B60K 6/387* (2013.01); *B60K 2006/381* (2013.01); *Y02T 10/6239* (2013.01)

(58) Field of Classification Search
CPC .... B60W 20/00; B60W 10/08; B60W 10/115
USPC ............................ 477/5; 180/62.245; 701/22
See application file for complete search history.

(56) References Cited

U.S. PATENT DOCUMENTS

| | | | | |
|---|---|---|---|---|
| 2009/0312128 A1* | 12/2009 | Kim et al. | .......................... | 475/5 |
| 2010/0125021 A1* | 5/2010 | Matsubara et al. | ................ | 477/5 |
| 2011/0220428 A1* | 9/2011 | Ando | ........................ | 180/65.245 |

FOREIGN PATENT DOCUMENTS

| | | |
|---|---|---|
| JP | 2009149116 A | 7/2009 |
| KR | 10-2009-0016034 | 2/2009 |
| KR | 10-2009-0057492 | 6/2009 |

* cited by examiner

*Primary Examiner* — Helal A Algahaim
*Assistant Examiner* — Mahmoud Ismail
(74) *Attorney, Agent, or Firm* — Mintz Levin Cohn Ferris Glovsky and Popeo, P.C.; Peter F. Corless (57) ABSTRACT

Disclosed is a control system and method for controlling starting of an engine in a hybrid vehicle. More specifically, a controller is implemented that confirms first and second brake and the first and second clutch are released so that the system is in a neutral condition, confirm that the engine is stopped, and control the first motor-generator and the second motor-generator to rotate the engine at a predetermined rotational speed to start the engine.

15 Claims, 7 Drawing Sheets

$$(I_{ENG} + I_{C1})\dot{\omega}_{ENG} = \tau_{ENG} + \frac{1+R_1}{R_1}T_{MG1} \rightarrow \text{formula(1)}$$

$$\omega_{MG1} = -\frac{1}{R_1}\omega_{MG2} + \frac{1+R_1}{R_1}\omega_{ENG}^{Target} \rightarrow \text{formula(2)}$$

$$I_{R2}\dot{\omega}_{R2} = -R_2 T_{MG2} + \frac{R_2}{R_1}T_{MG1} \rightarrow \text{formula(3)}$$

$$\tau_{MG1}^{SpdControl} = \tau_{MG1}^{F/B} \quad \rightarrow \text{formula(4)}$$

$$\tau_{MG1}^{F/B} = \max(f_{PI}^{N,Crank}(\omega_{MG1}^{Target} - \omega_{MG1}), 0)$$
$$\rightarrow \text{formula(5)}$$

$$\omega_{MG1}^{Target} = -\frac{1}{R_1}\omega_{MG2} + \frac{1+R_1}{R_1}\omega_{ENG}^{Target} \rightarrow \text{formula(6)}$$

MG2

$$\tau_{MG2}^{SpdControl} = \tau_{MG2}^{F/F} + \tau_{MG2}^{F/B} \quad \rightarrow \text{formula(7)}$$

$$\tau_{MG2}^{F/F} = K_{F/F\_MG1}^{N,Crank}\left(\frac{1}{R_1}\right)\tau_{MG1} \quad \rightarrow \text{formula(8)}$$

$$\tau_{MG2}^{F/B} = f_{PI}^{N,Crank}(\omega_{MG2}^{Target} - \omega_{MG2}) \rightarrow \text{formula(9)}$$

$$\omega_{MG2}^{Target} = 0 \quad \rightarrow \text{formula(10)}$$

CONTROL SYSTEM AND METHOD OF HYBRID VEHICLE

CROSS-REFERENCE TO RELATED APPLICATION

This application claims priority to and the benefit of Korean Patent Application No. 10-2011-0132870 filed in the Korean Intellectual Property Office on Dec. 12, 2011, the entire contents of which are incorporated herein by reference.

BACKGROUND OF THE INVENTION (a) Field of the Invention

The present invention relates to a system and method for controlling a hybrid vehicle that controls a rotational speed of an engine to enable starting of the engine in a hybrid system that includes an engine, a first motor-generator, and a second motor-generator.

(b) Description of the Related Art

Generally, automatic transmissions use hydraulic pressure to shift gears in a multi step process to output the appropriate torque from a rotational torque of an engine/motor according driving conditions and driver demand. Some hybrid vehicles utilize two motor/generators (MG) and one engine that are connected through a planetary gear set and control the motor/generator to achieve a continuous variable shifting system or CVT.

The engine, the first and second motor/generators, and two planetary gear sets are used to continuously vary the output speed of a transmission according to driving conditions of the vehicle and driver demand. In particular, each speed of the first and second motor/generators are controlled, accordingly.

More specifically, a CVT can change steplessly through an infinite number of effective gear ratios between maximum and minimum values. This is much different than the traditional mechanical transmission that has a fixed number of gear ratios. A CVT allows the driving shaft to maintain a constant angular velocity over a range of output velocities. This can provide better fuel efficiency than other types of transmissions by enabling the engine to run at its most efficient revolutions per minute (RPM) for a range of vehicle speeds. CVT's also can maximize the performance of a vehicle by allowing the engine to turn at an RPM which produces peak power. Finally, a CVT does not strictly require the presence of a clutch, allowing for a clutch to be omitted from the overall system. By omitting the clutch, maintenance costs and manufacturing costs can be significantly reduced.

In these types of systems, the first motor/generator is often speed controlled according to the driving condition of the engine and the second motor/generator is torque controlled together with the engine to control the entire output torque. In a neutral mode, however, an engine is separated from a wheel shaft and all rotational elements (i.e., the wheels) are no longer forcible rotated.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a control system and method of a hybrid vehicle having advantages of improving starting performance of an engine in a neutral mode when the engine is cold (−30° C.).

A control system and method of a hybrid vehicle that includes a first and a second planetary gear set, an engine, a first and second motor/generator, an output shaft, a first and second clutch and a first and second brake. More specifically, the first planetary gear set includes a first sun gear, a first planetary gear, a first ring gear, and a first carrier, and the second planetary gear set includes a second sun gear, a second planetary gear, a second ring gear, and a second carrier. An output shaft of the engine may be directly connected to the first carrier. The first motor-generator may be configured to rotate the first ring gear, and the second motor-generator may be directly connected to the second sun gear to rotate the second sun gear and the first sun gear through the second sun gear.

The first brake may be configured to apply friction to the first ring gear to reduce the rotational speed of the first ring gear, and the second brake may be configured to apply friction to the second ring gear to reduce the rotational speed of the second ring gear. The first clutch may selectively connect the first ring gear with the first carrier, and the second clutch may selectively connect the first carrier with the second ring gear.

In an exemplary embodiment of the present invention, a controller may be configured to confirm that the first and second brake and the first and second clutch are released so that the system is in a neutral condition, confirm that the engine has stopped operating, and operate/control the first motor-generator and the second motor-generator to rotate the engine at a predetermined rotational speed to start the engine.

In some exemplary embodiments of the present invention, the rotational speed of the second motor-generator may be controlled/calculated by a below formula 6.

$$\omega_{MG1}^{Target} = -\frac{1}{R_1}\omega_{MG2} + \frac{1+R_1}{R_1}\omega_{ENG}^{Target} \qquad \text{Formula 6}$$

A rotational speed of the first motor-generator may be controlled to ensure that the engine reaches a target speed, and the angular acceleration of the second ring gear may be controlled so that the torque that is transferred to the output shaft that is connected to the second ring gear reaches 0.

A target speed of the first motor-generator may be calculated by a below formula 2 for a target speed of the engine.

$$\omega_{MG1} = -\frac{1}{R_1}\omega_{MG2} + \frac{1+R_1}{R_1}\omega_{ENG}^{Target} \qquad \text{Formula 2}$$

The angular acceleration of the second ring gear may be calculated by a below formula 3.

$$I_{R2}\dot{\omega}_{R2} = -R_2 T_{MG2} + \frac{R_2}{R_1} T_{MG1} \qquad \text{Formula 3}$$

As described above, in the control system and method of a hybrid vehicle according to the exemplary embodiment of the present invention, an engine is effectively started in a neutral mode of a FHS4 (flexible hybrid system) by applying the above control to the starting process. Further, in the illustrative embodiment of the present invention, when the temperature of an engine is less than −30° C., the engine in the above described system is able to stably reach a target speed to secure startability of the engine even in colder temperatures.

DESCRIPTION OF SYMBOLS

100: engine
MG1: first motor-generator
MG2: second motor-generator
PG1: first planetary gear set
r1: first ring gear,
s1: first sun gear
p1: first planetary gear
c1: first carrier
PG2: second planetary gear set
r2: second ring gear,
s2: second sun gear
p2: second planetary gear
c2: second carrier
BK1: first brake
BK2: second brake
CL1: first clutch
CL2: second clutch

DETAILED DESCRIPTION OF THE EMBODIMENTS

The present invention will be described more fully hereinafter with reference to the accompanying drawings, in which exemplary embodiments of the invention are shown.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a server or a network. Additionally, although the exemplary embodiment is described as using one control unit to perform the above process, it is understood that the above processes may also be performed by a plurality of control units, controllers, processors or the like.

An exemplary embodiment of the present invention will hereinafter be described in detail with reference to the accompanying drawings.

Figure 1:
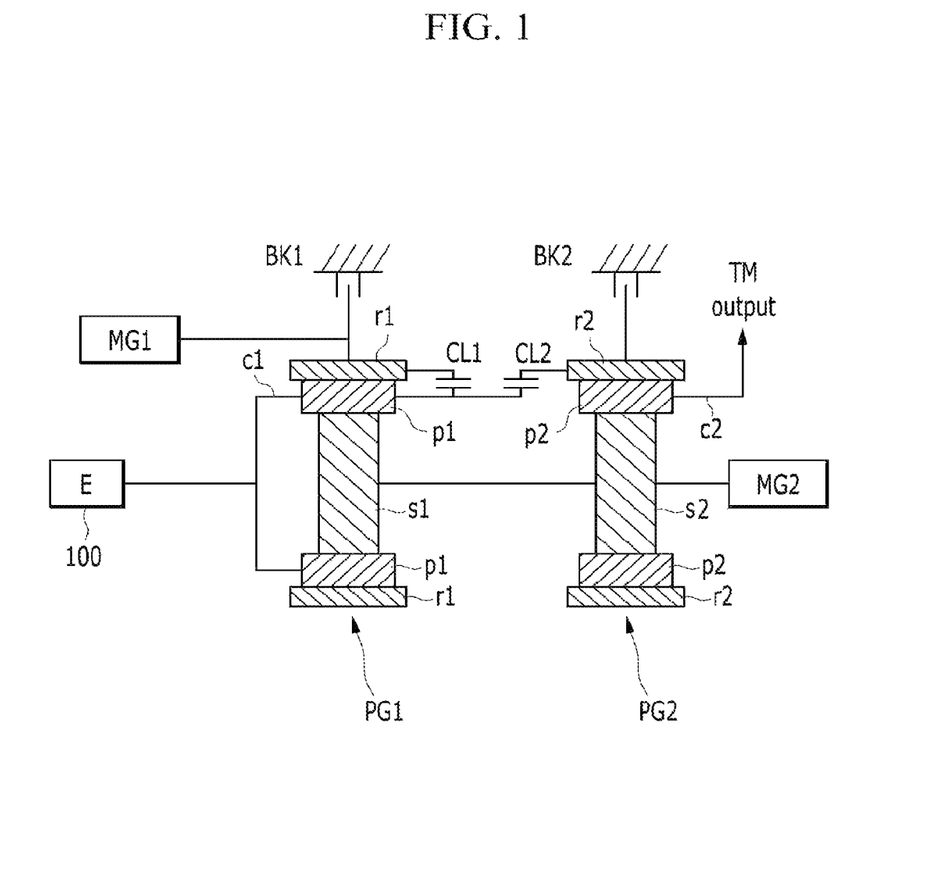
FIG. 1 is a schematic diagram of a gear shifting system of a hybrid vehicle according to an exemplary embodiment of the present invention.

FIG. 1 is a schematic diagram of a gear shifting system of a hybrid vehicle according to an exemplary embodiment of the present invention. As shown, a hybrid vehicle includes an engine 100, a first planetary gear set PG1, a second planetary gear set PG2, a first motor-generator MG1, a first brake BK1, a first clutch CL1, a second clutch CL2, a second brake BK2, and a second motor-generator MG2.

The first planetary gear set PG1 includes a first sun gear s1, a first planetary gear p1, a first ring gear r1, and a first carrier c1, and the output shaft of the engine 100 is configured to rotate the first sun gear s1. The output shaft of the first motor-generator MG1 is configured to rotate the first ring gear r1, and the first brake BK1 selectively locks the output shaft of the first motor-generator MG1 and the first ring gear r1.

The first clutch CL1 selectively connects the first ring gear r1 with the first carrier c1, and the second clutch CL2 selectively connects the first carrier c1 with the second ring gear r2. The second brake BK2 is configured to selectively lock the second ring gear r2, and the second carrier c2 is directly connected to the output shaft. The first sun gear s1 is directly connected to the second sun gear s2, and the second motor-generator MG2 is configured to rotate the second sun gear s2.

In a neutral condition of an exemplary embodiment of the present invention, the first and second clutch CL1 and CL2 and the first and second brake BK1 and BK2 are disengaged and the first motor-generator MG1, the second motor-generator MG2, and the engine 100 are in the proper state for the starting process to begin.

When the engine 100 is stopped, the first motor-generator MG1 and the second motor-generator MG2 are speed controlled or torque controlled to induce the engine to reach a target speed for the starting the engine. As a result, the engine 100 is cranked (started smoothly so that the driver does not perceive the cranking of the engine.

Figure 2:
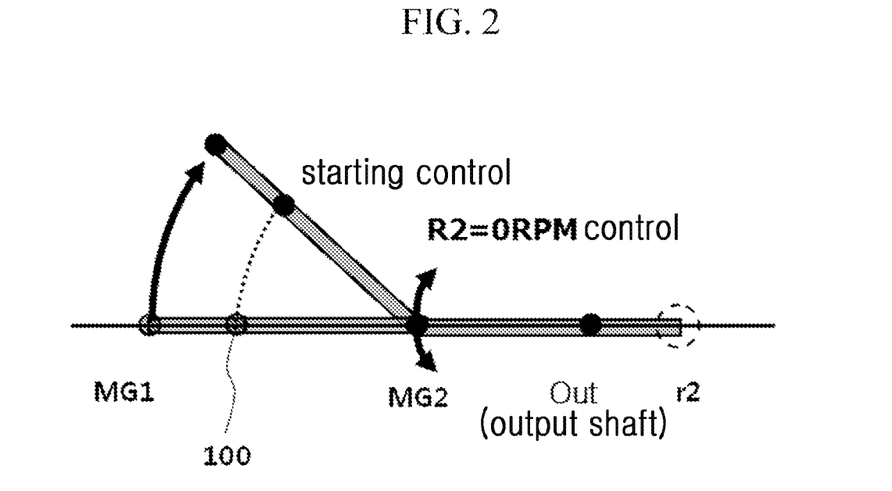
FIG. 2 is a graph illustrating a gear shifting system of a hybrid vehicle as a lever type according to an exemplary embodiment of the present invention.

FIG. 2 is a graph illustrating a gear shifting system of a hybrid vehicle as a lever type illustration according to an exemplary embodiment of the present invention. Referring to FIG. 2, the first motor-generator MG1 generates torque to rotate the engine, and the second motor-generator MG2 is torque controlled so that the speed thereof reaches 0. Accordingly, the first motor-generator MG1 is speed controlled to induce the engine 100 to reach a target speed, and the second motor-generator MG2 is controlled to a speed of 0.

Figure 3:
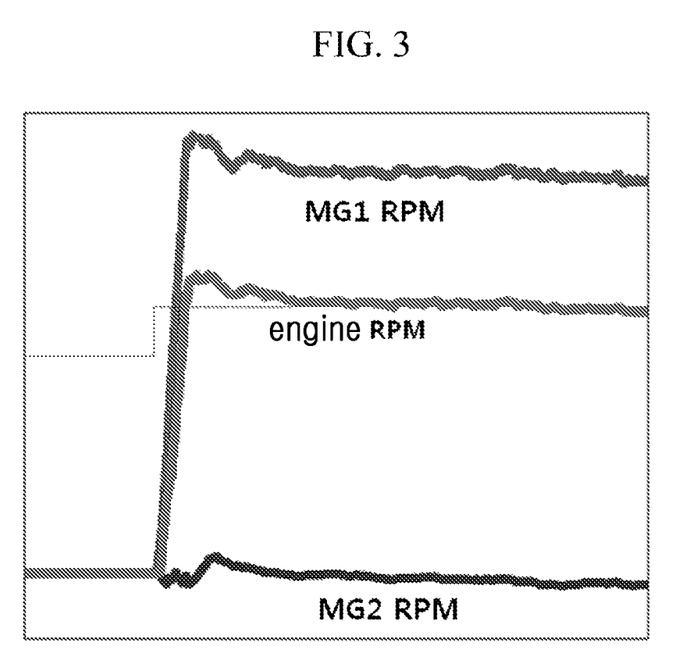
FIG. 3 is a graph illustrating a rotational speed of constituent elements in an engine starting process of a gear shifting system of a hybrid vehicle according to an exemplary embodiment of the present invention.

FIG. 3 is a graph illustrating a rotational speed of constituent elements in an engine starting process of a gear shifting system of a hybrid vehicle according to an exemplary embodiment of the present invention. Referring to FIG. 3, the rotational speed of the engine is varied proportional to the rotational speed of the first motor-generator MG1, and the rotational speed of the second motor-generator MG2 converges to 0 as a result of the applied control. Notably, however, in the second motor generator, a predetermined speed is generated early on. However, as time goes on, the speed of the second motor generator converges to 0.

Figure 4:
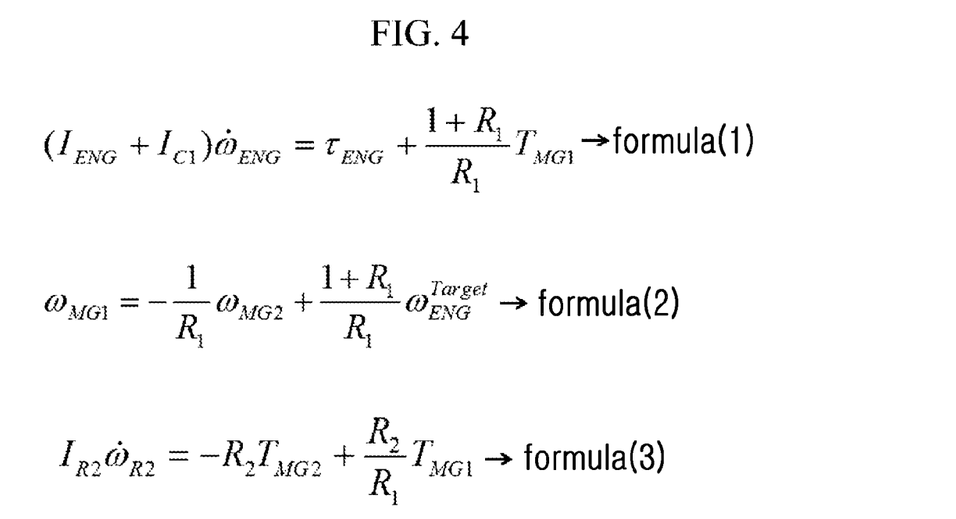
FIG. 4 shows formulas for controlling a gear shifting system of a hybrid vehicle according to an exemplary embodiment of the present invention.

FIG. 4 illustrates formulas for controlling a gear shifting system of a hybrid vehicle according to an exemplary embodiment of the present invention. Referring to FIG. 4, a formula 2 is induced by a formula 1, and the rotational speed of the first motor-generator MG1 and the second motor-generator MG2 can be drawn in the formula 2 so as to induce the engine 100 to reach a target speed.

$$(I_{ENG} + I_{C1})\dot{\omega}_{ENG} = \tau_{ENG} + \frac{1+R_1}{R_1}T_{MG1} \quad \text{formula 1}$$

$$\omega_{MG1} = -\frac{1}{R_1}\omega_{MG2} + \frac{1+R_1}{R_1}\omega_{ENG}^{Target} \quad \text{Formula 2}$$

$I_{ENG}$ is a rotational inertia value of the engine 100, $I_{c1}$ is a rotational inertia moment of the first clutch CL1, $\dot{\omega}_{ENG}$ is a rotation angle acceleration of the engine 100, $\tau_{ENG}$ is an output torque of the engine 100 ($T_{MG1} = \tau_{MG1} - \dot{\omega}_{MG1}I_{MG1}$), $\tau_{MG1}$ is a torque of the first motor-generator MG1, $\dot{\omega}_{MG1}$ is angle acceleration of the first motor-generator MG1, and $I_{MG1}$ is a inertia moment of the first motor-generator MG1. $R_1$ is a value representing the number of teeth of the first ring gear r1 divided by the number of teeth of the first sun gear s1, $\omega_{MG1}$ is a rotation angle speed of the first motor-generator MG1, $\omega_{MG2}$ is a rotation angle speed of the second motor-generator MG2, and $\omega_{ENG}^{Target}$ is a target speed of the engine 100.

Referring to back to FIG. 4, a speed of the second ring gear r2 is calculated in a below formula 3.

$$I_{R2}\dot{\omega}_{R2} = -R_2T_{MG2} + \frac{R_2}{R_1}T_{MG1} \quad \text{Formula 3}$$

$I_{R2}$ is a rotational inertia moment of the second ring gear r2, $\dot{\omega}_{R2}$ is a rotational angle acceleration of the second ring gear r2, $R_2$ is a value equal to the number of the teeth in the second ring gear r2 divided by the number of the teeth of the second sun gear, $T_{MG2} = \tau_{MG2} - \dot{\omega}_{MG2}I_{MG2}$, $\tau_{MG2}$ is a torque of the second motor-generator MG2, $\dot{\omega}_{MG2}$ is an angle acceleration of the second motor-generator MG2, $I_{MG2}$ is an inertia moment of the second motor-generator MG2, $T_{MG1} = \tau_{MG1}\dot{\omega}_{MG1}I_{Mg1}$, $\tau_{MG1}$ is a torque of the first motor-generator MG1, $\dot{\omega}_{MG1}$ is an angle acceleration of the first motor-generator MG1, and $I_{MG1}$ is an inertia moment of the first motor-generator MG1.

Figure 5:
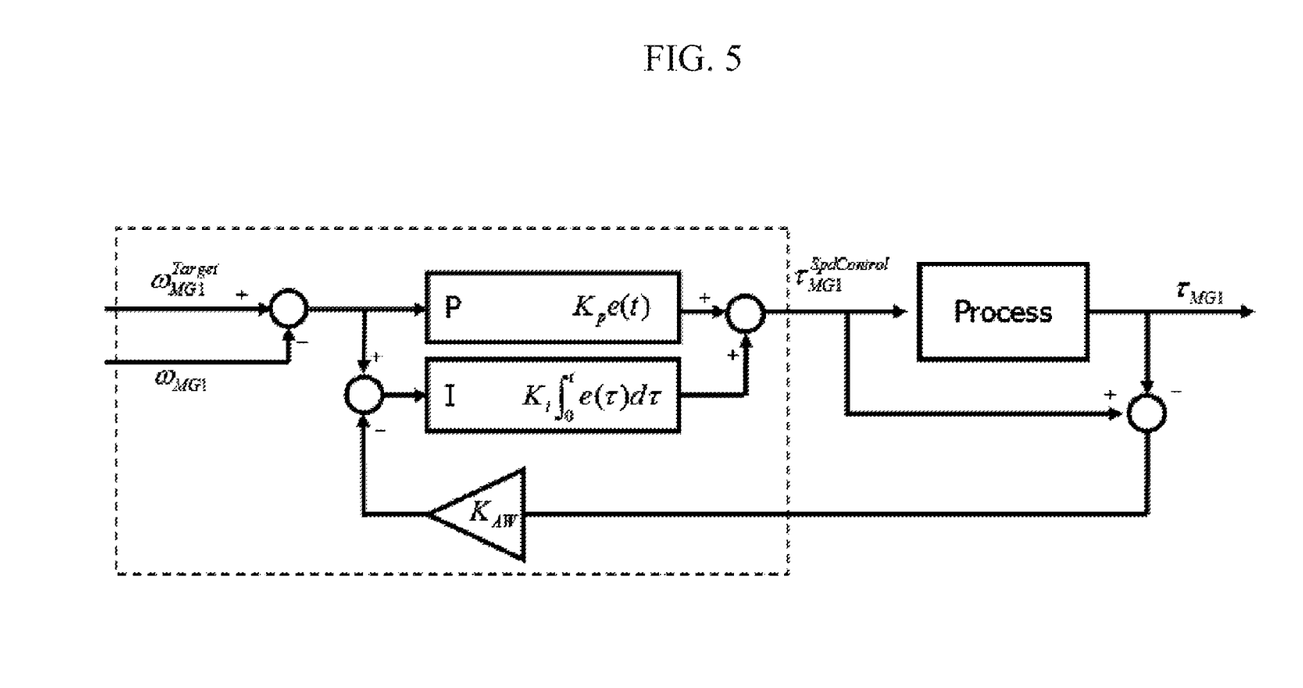
FIG. 5 is a flowchart for controlling a first motor-generator for controlling a gear shifting system of a hybrid vehicle according to an exemplary embodiment of the present invention.

FIG. 5 is a flowchart for controlling a first motor-generator for controlling a gear shifting system of a hybrid vehicle according to an exemplary embodiment of the present invention. Referring to FIG. 5, the speed ($\omega_{MG1}$) of the first motor-generator MG1 and the target speed ($\omega_{MG1}^{target}$) of the first motor-generator MG1 are inputted and are proportional integral (PI) controlled to speed control ($\tau_{MG}^{specontrol}$) the torque of the first motor-generator MG1 to generate the output torque ($\tau_{MG1}$) of the first motor-generator MG1.

Figure 6:
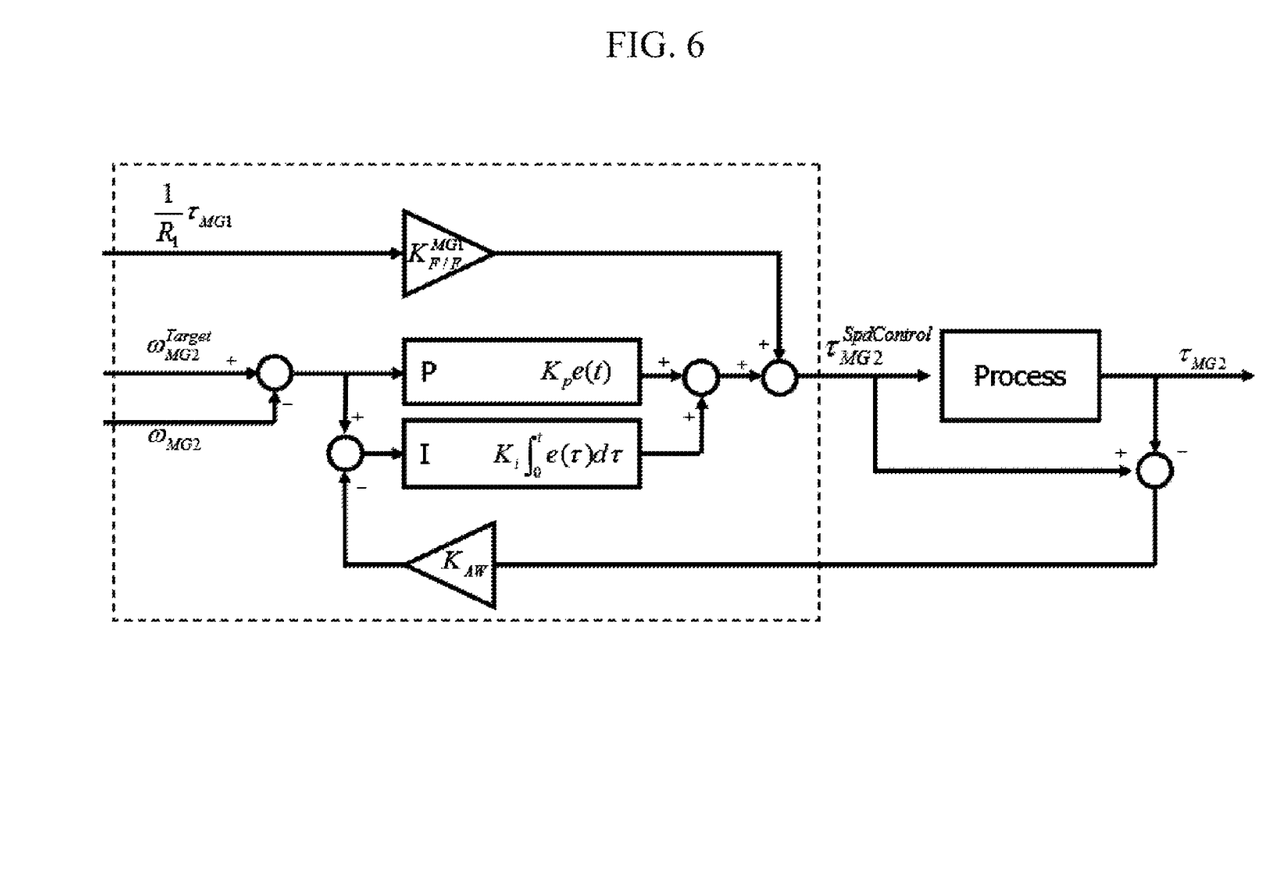
FIG. 6 is a flowchart for controlling a second motor-generator for controlling a gear shifting system of a hybrid vehicle according to an exemplary embodiment of the present invention.

FIG. 6 is a flowchart for controlling a second motor-generator for controlling a gear shifting system of a hybrid vehicle according to an exemplary embodiment of the present invention. Referring to FIG. 6, a target speed ($\omega_{MG2}^{target}$) and a present speed ($\omega_{MG2}$) of the second motor-generator MG2 are inputted and PI controlled. A factor $$\left(\frac{1}{R1}\tau_{mg1}\right)$$

of the first motor-generator MG1 is feedforward added thereto, and the target speed and present speed are processed to calculate torque ($\tau_{mg2}$) of the second motor-generator MG2.

In an exemplary embodiment of the present invention, the first motor-generator MG1 is used to rotate the engine 100 and simultaneously the torque of the second motor-generator MG2 is used to make the second motor-generator MG2 to diverge to 0 RPMs. The output torque of the first motor-generator MG1 is calculated through a feedback control according to the speed of the engine 100. Further, the torque of the second motor-generator MG2 is calculated by feedback and PI controlling the feedforward torque of the first motor-generator MG1 and the rotational speed of the second ring gear r2.

Figure 7:
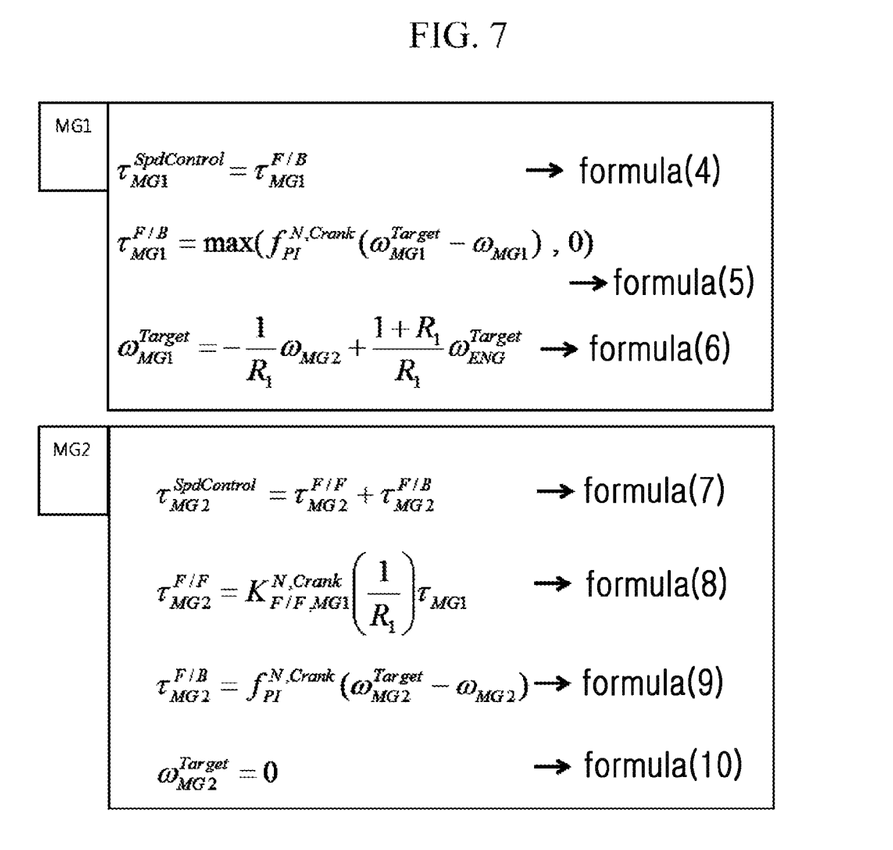
FIG. 7 shows formulas for controlling a first and second motor-generator for controlling a gear shifting system of a hybrid vehicle according to an exemplary embodiment of the present invention.

FIG. 7 shows formulas for controlling a first and second motor-generator for controlling a gear shifting system of a hybrid vehicle according to an exemplary embodiment of the present invention. In a below formula 4, the torque of the first motor-generator MG1 is feedback controlled for the speed control of the first motor-generator MG1, wherein the formula shows the outputted torque.

$$\tau_{MG1}^{Spdcontrol} = \tau_{MG1}^{F1B} \quad \text{Formula 4}$$

$\tau_{MG}^{SpdControl}$ is an output torque for speed control of the first motor-generator MG1, and $\tau_{MG1}^{F1B}$ is a feedback output torque of the first motor-generator MG1. In the formula 4, $$\tau_{Mg1}^{F1B} = \max(f_{PI}^{N,Crank}(\omega_{MG1}^{Target} - \omega_{MG1}), 0) \quad \text{Formula 5}$$

Here, $\tau_{MG1}^{F1B}$ is a feedback output torque of the first motor-generator MG1, $\omega_{MG}^{Target}$ is a target speed of the first motor-generator MG1, and $\omega_{MG1}$ is a speed of the first motor-generator MG1.

A relationship between a target speed of the first motor-generator MG1, a speed of the second motor-generator MG2, and a target speed of the engine 100 is shown in a below formula 6.

$$\omega_{MG1}^{Target} = -\frac{1}{R_1}\omega_{MG2} + \frac{1+R_1}{R_1}\omega_{ENG}^{Target} \quad \text{Formula 6}$$

Here, $\omega_{MG}^{Target}$ is a target speed of the first motor-generator MG1, $\omega_{MG2}$ is a speed of the second motor-generator MG2, and $\omega_{ENG}^{Target}$ is a target speed of the engine 100.

As shown in a below formula 7, the torque of the second motor-generator MG2 is feedback and feedforward controlled to output torque for speed control of the second motor-generator MG2.

$$\tau_{MG2}^{SpdControl} = \tau_{MG2}^{F1F} + \tau_{MG2}^{F1B} \quad \text{Formula 7}$$

$\tau_{MG}^{SpdControl}$ is an output torque for speed control of the second motor-generator MG2, $\tau_{MG2}^{F1F}$ is a feedforward output torque of the second motor-generator MG2, and $\tau_{MG2}^{F1B}$ is a feedback output torque of the second motor-generator MG2. In a formula 7, $$\tau_{MG2}^{F/F} = K_{F/F,MG1}^{N,Crank}\left(\frac{1}{R_1}\right)\tau_{MG1} \qquad \text{Formula 8}$$

In a formula 7, $$\tau_{MG2}^{F1B} = f_{PI}^{N,Crank}(\omega_{MG2}^{Target} - \omega_{MG2}) \qquad \text{Formula 9}$$

Further, a target speed of the second motor-generator MG2 is explained as a below formula 10 in an exemplary embodiment of the present invention.

$$\omega_{MG2}^{Target} = 0 \qquad \text{Formula 10}$$

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A control method of a hybrid vehicle including a first planetary gear set having a first sun gear, a first planetary gear, a first ring gear, and a first carrier, a second planetary gear set having a second sun gear, a second planetary gear, a second ring gear, and a second carrier, an engine directly connected to the first carrier, a first motor-generator configured to rotate the first ring gear, a second motor-generator directly connected to the second sun gear and configured to rotate the second sun gear and the first sun gear, a first brake configured to brake the first ring gear, a second brake configured to brake the second ring gear, a first clutch configured to selectively connect the first ring gear with the first, and a second clutch configured to selectively connect the first carrier with the second ring gear, the control method comprising:
    confirming, by a controller, that the first and second brake and the first and second clutch are released and in neutral condition;
    confirming, by the controller, that the engine is stopped; and
    operating, by the controller, the first motor-generator and the second motor-generator to induce the engine to rotate at a predetermined rotational speed to start the engine,
    wherein the engine is directly connected to the first carrier through an output shaft of the engine, and
    wherein the first motor-generator is directly connected to the first ring gear;
    wherein the rotational speed of the second motor-generator is controlled and calculated by a below formula 6:
    wherein, $\omega_{MG1}^{Target}$ is a target speed of the first motor-generator, $R_1$ is a value representing the number of teeth of the first ring gear divided by the number of teeth of the first sun gear, $\omega_{MG2}$ is a speed of the second motor-generator, and $\omega_{ENG}^{Target}$ is a target speed of the engine.

2. The control method of a hybrid vehicle of claim 1, wherein a rotational speed of the first motor-generator is controlled to induce the engine reach a target speed.

3. The control method of a hybrid vehicle of claim 1, wherein an angular acceleration of the second ring gear are controlled so that a torque that is transferred to the output shaft connected to the second ring gear diverges to 0.

4. The control method of a hybrid vehicle of claim 2, wherein a target speed of the first-motor generator is calculated by a below formula 2 for a target speed of the engine:

$$\omega_{MG1} = -\frac{1}{R_1}\omega_{MG2} + \frac{1+R_1}{R_1}\omega_{ENG}^{Target};$$

wherein, $\omega_{MG1}$ is a rotation angel of the speed of the first motor-generator, $R_1$ is a value representing the number of teeth of the first ring gear divided by the number of teeth of the first sun gear, $\omega_{MG2}$ is a rotation angel speed of the second motor-generator, and $\omega_{ENG}^{Target}$ is a target speed of the engine.

5. The control method of a hybrid vehicle of claim 3, wherein the angular acceleration of the second ring gear is calculated by a below formula 3:

$$I_{R2}\dot{\omega}_{R2} = -R_2 T_{MG2} + \frac{R_2}{R_1}T_{MG1};$$

wherein, $I_{R2}$ is a rotational inertia moment of the second ring gear, $\dot{\omega}_{R2}$ is a rotational angle acceleration of the second ring gear, $R_2$ is a value equal to the number of teeth in the second ring gear divided by the number of the teeth of the second sun gear, $R_1$ is a value representing the number of teeth of the first ring gear divided by the number of teeth of the first sun gear, $T_{MG2} = \tau_{MG2} - \dot{\omega}_{MG2}I_{MG2}$, $\tau_{MG2}$ is a torque of the second motor-generator, $\dot{\omega}_{MG2}$ is an angle acceleration of the second motor-generator, $I_{MG2}$ is an inertia moment of the second motor-generator, $T_{MG1} = T_{MG1} - \dot{\omega}_{MG1}I_{MG1}$, $\tau_{MG1}$ is a torque of the first motor-generator, $\dot{\omega}_{MG1}$ is an angle acceleration of the first motor-generator, $I_{MG1}$ is an inertia moment of the first motor-generator.

6. A system for a hybrid vehicle comprising:
    a first planetary gear set having a first sun gear, a first planetary gear, a first ring gear, and a first carrier;
    a second planetary gear set having a second sun gear, a second planetary gear, a second ring gear, and a second;
    an engine is directly connected to the first carrier through an output shaft of the engine;
    the first motor-generator is directly connected to the first ring gear and configured to rotate the first ring gear;
    a second motor-generator directly connected to the second sun gear and configured to rotate the second sun gear and the first sun gear;
    a first brake configured to brake the first ring gear;
    a second brake configured to brake the second ring gear;
    a first clutch configured to selectively connect the first ring gear with the first carrier;
    a second clutch configured to selectively connect the first carrier with the second ring gear; and
    a controller configured to confirm that the first and the second brake and the first and the second clutch are released and in neutral condition, confirm that the engine is stopped, and control the first motor-generator and the second motor-generator to induce the engine rotate at a predetermined rotational speed to start the engine;
    wherein the rotational speed of the second motor-generator is controlled and calculated by a below formula 6:
    wherein, $\omega_{MG1}^{Target}$ is a target speed of the first motor-generator, $R_1$ is a value representing the number of teeth of the first ring gear divided by the number of teeth of the first sun gear, $\omega_{MG2}$ is a speed of the second motor-generator, and $\omega_{ENG}^{Target}$ is a target speed of the engine.

7. The system of claim 6, wherein a rotational speed of the first motor-generator is controlled to induce the engine reach a target speed.

8. The system of claim 7, wherein a target speed of the first-motor generator is calculated by a below formula 2 for a target speed of the engine:

$$\omega_{MG1} = -\frac{1}{R_1}\omega_{MG2} + \frac{1+R_1}{R_1}\omega_{ENG}^{Target};$$

wherein, $\omega_{MG1}$ is a rotation angel of the speed of the first motor-generator, $R_1$ is a value representing the number of teeth of the first ring gear divided by the number of teeth of the first sun gear, $\omega_{MG2}$ is a rotation angel speed of the second motor-generator, and $\omega_{ENG}^{Target}$ is a target speed of the engine.

9. The system of claim 6, wherein an angular acceleration of the second ring gear are controlled so that a torque that is transferred to the output shaft connected to the second ring gear diverges to 0.

10. The system of claim 9, wherein the angular acceleration of the second ring gear is calculated by a below formula 3:

$$I_{R2}\dot{\omega}_{R2} = -R_2 T_{MG2} + \frac{R_2}{R_1} T_{MG1};$$

wherein, $I_{R2}$ is a rotational inertia moment of the second ring gear, $\dot{\omega}_{R2}$ is a rotational angle acceleration of the second ring gear, $R_2$ is a value equal to the number of teeth in the second ring gear divided by the number of the teeth of the second sun gear, $R_1$ is a value representing the number of teeth of the first ring gear divided by the number of teeth of the first sun gear, $T_{MG2}=\tau_{MG2}-\dot{\omega}_{MG2}I_{MG2}$, $\tau_{MG2}$ is a torque of the second motor-generator, $\dot{\omega}_{MG2}$ is an angle acceleration of the second motor-generator, $I_{MG2}$ is an inertia moment of the second motor-generator, $T_{MG1}=\tau_{MG1}-\dot{\omega}_{MG1}I_{MG1}$, $\tau_{MG1}$ is a torque of the first motor-generator, $\dot{\omega}_{MG1}$ is an angle acceleration of the first motor-generator, $I_{MG1}$ is an inertia moment of the first motor-generator.

11. A non-transitory computer readable medium containing program instructions executed by a processor or controller, the computer readable medium comprising:
program instructions that confirm that a first and a second brake and a first and a second clutch are released and in neutral condition;
program instructions that confirm that the engine is stopped; and
program instructions that control the first motor-generator and the second motor-generator to induce the engine rotate at a predetermined rotational speed to start the engine,
wherein an engine is directly connected to a first carrier through an output shaft of the engine,
wherein a first motor-generator is directly connected to a first ring gear, and
wherein a second motor-generator is directly connected to a second sun gear and configured to rotate the second sun gear and a first sun gear;
wherein the rotational speed of the second motor-generator is controlled and calculated by a below formula 6:
wherein, $\omega_{MG1}^{Target}$ is a target speed of the first motor-generator, $R_1$ is a value representing the number of teeth of the first ring gear divided by the number of teeth of the first sun gear, $\omega_{MG2}$ is a speed of the second motor-generator, and $\omega_{ENG}^{Target}$ is a target speed of the engine.

12. The non-transitory computer readable medium of claim 11, wherein a rotational speed of the first motor-generator is controlled to induce the engine reach a target speed.

13. The non-transitory computer readable medium of claim 12, wherein a target speed of the first-motor generator is calculated by a below formula 2 for a target speed of the engine:

$$\omega_{MG1} = -\frac{1}{R_1}\omega_{MG2} + \frac{1+R_1}{R_1}\omega_{ENG}^{Target};$$

wherein, $\omega_{MG1}$ is a rotation angel of the speed of the first motor-generator, $R_1$ is a value representing the number of teeth of the first ring gear divided by the number of teeth of the first sun gear, $\omega_{MG2}$ is a rotation angel speed of the second motor-generator, and $\omega_{ENG}^{Target}$ is a target speed of the engine.

14. The non-transitory computer readable medium of claim 11, wherein an angular acceleration of the second ring gear are controlled so that a torque that is transferred to the output shaft connected to the second ring gear diverges to 0.

15. The non-transitory computer readable medium of claim 14, wherein the angular acceleration of the second ring gear is calculated by a below formula 3:

$$I_{R2}\dot{\omega}_{R2} = -R_2 T_{MG2} + \frac{R_2}{R_1} T_{MG1};$$

wherein, $I_{R2}$ is a rotational inertia moment of the second ring gear, $\dot{\omega}_{R2}$ is a rotational angle acceleration of the second ring gear, $R_2$ is a value equal to the number of teeth in the second ring gear divided by the number of the teeth of the second sun gear, $R_1$ is a value representing the number of teeth of the first ring gear divided by the number of teeth of the first sun gear, $T_{MG2}=\tau_{MG2}-\dot{\omega}_{MG2}I_{MG2}$, $\tau_{MG2}$ is a torque of the second motor-generator, $\dot{\omega}_{MG2}$ is an angle acceleration of the second motor-generator, $I_{MG2}$ is an inertia moment of the second motor-generator, $T_{MG1}=T_{MG1}-\dot{\omega}_{MG1}I_{MG1}$, $\tau_{MG1}$ is a torque of the first motor-generator, $\dot{\omega}_{MG1}$ is an angle acceleration of the first motor-generator, $I_{mGi}$ is an inertia moment of the first motor-generator.

* * * * *